No. 12,573. REISSUED DEC. 11, 1906.
E. S. LEA & J. DEGEN.
AUTOMATIC PACKING.
APPLICATION FILED OCT. 31, 1906.
Fig: 1,
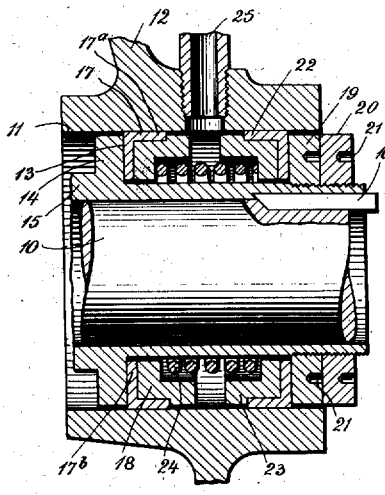
Fig: 2,
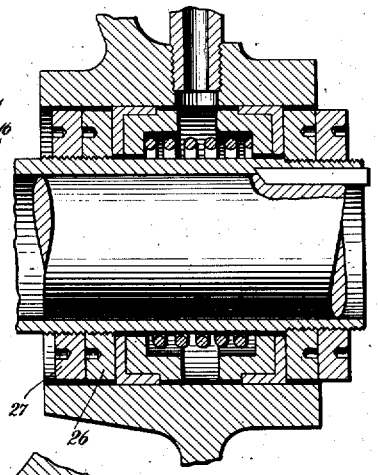
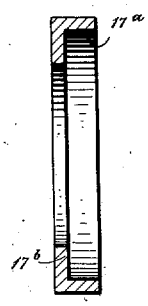
Fig: 4,
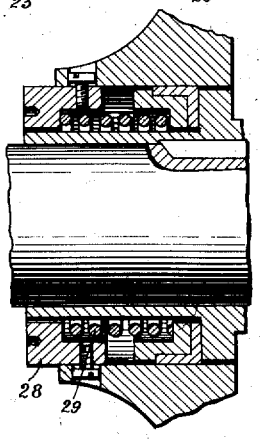
Fig: 3.
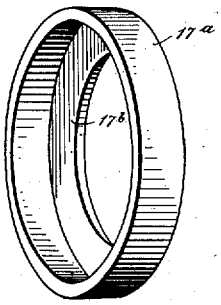
Fig: 5,
Witnesses
Max F. A. Doring.
Lillie Cass.
Edward S. Lea & Julius Degen,
Inventors
By their Attorneys
Prindle and Williamson.

UNITED STATES PATENT OFFICE.

EDWARD S. LEA AND JULIUS DEGEN, OF TRENTON, NEW JERSEY, ASSIGNORS, BY MESNE ASSIGNMENTS, TO LEA-DEGEN PUMP COMPANY, OF TRENTON, NEW JERSEY, A CORPORATION OF NEW JERSEY.

AUTOMATIC PACKING.

No. 12,573. Specification of Reissued Letters Patent. Reissued Dec. 11, 1906.

Original No. 811,934, dated February 6, 1906. Application for reissue filed October 31, 1906. Serial No. 341,508.

*To all whom it may concern:*

Be it known that we, EDWARD S. LEA and JULIUS DEGEN, of Trenton, county of Mercer, State of New Jersey, did invent certain new and useful Improvements in Automatic Packing, for which Letters Patent No. 811,934 were issued upon the 6th day of February, 1906, which Letters Patent have been found to be inoperative and defective and not to cover fully the invention set forth in the specification and shown in the drawings, which were filed by us in the Patent Office on the 6th day of May, 1905, preparatory to the obtaining of said Letters Patent. Now, therefore, being desirous of reissuing said Letters Patent, we do hereby declare the following to be a full and clear specification thereof.

The object of our invention has been to provide a packing for rotatably-mounted shafts where they pass through a wall having different pressues upon the opposite sides thereof, which packing shall have, among others, the following advantages: that of automatically compensating for the wear which occurs on the shaft, that of having the wear take place substantially only upon a plane surface, and that of enabling the packing to be flooded with a fluid-pressure equal but opposite to that to be sustained; and to such ends our invention consists in the automatic packing hereinafter specified.

While the invention is capable of application to many different uses, it is specially designed for centrifugal pumps, and we have iiinstrated it by an embodiment in such a pump.

In the accompanying drawings, Figure 1 illustrates a vertical sectional view of our packing applied to a centrifugal pump. Figs. 2 and 3 are similar views of other embodiments of our invention, and Figs. 4 and 5 are respectively a transverse sectional view and a perspective view of a packing-ring used in our said packing.

In Fig. 1 we have illustrated our packing as applied to an opening in a centrifugal-pump casing through which the shaft passes, such as the pump of our Patent No. 790,795, granted May 23, 1905. In such figure the shaft 10 passes through a bore 11 in the casing 12. In order to pack the shaft, it is necessary that it have a surface 13 transverse to the shaft, and such surface may be formed on a collar 14, carried in the present instance by a sleeve 15, that is secured upon the shaft by a key 16; but the said surface 13 may, if desired, be formed directly on the shaft. An annular packing 17 is provided, which packing has a cylindrical portion $17^a$ and a plane portion $17^b$, the plane portion resting against the surface 13 and the cylindrical portion against the wall of the bore 11. A ring 18 fits into the angle between the plane and cylindrical portions of the packing and bears against the bore 11, the ring being sufficiently larger than the sleeve 15 so that it will not rotate with the sleeve, but will be stationary with the bore. Stops may be provided to prevent rings 18 from rotating. A nut 19 is threaded on the sleeve 15 and is preferably smaller than the bore, so that the friction of the bore will not tend to unscrew it on the sleeve. The nut 19 is locked by a lock-nut 20, and each of said nuts is provided with any convenient means for turning it, such as the holes 21, that are adapted to be engaged by a spanner-wrench. A packing 22, which may be precisely like the packing 17, bears against the inner surface $19^a$ of the nut 19 and against the wall of the bore, and a ring 23, which may be precisely like the ring 18, holds the packing up against the said surface and wall. A spring 24 may be interposed between the said rings 18 and 23 to spread them apart and force them against their respective packings. A pipe 25 may be provided to admit fluid under pressure to the chamber between the rings 18 and 23 to press said rings and their packings apart and against the surfaces to be packed, and such pressure may take the place of or work conjointly with the spring.

In the operation of the embodiment of our invention illustrated in Fig. 1 air is trying to leak from the right into the casing. The said shaft, sleeve, collar 14, and the nuts 19 and 20 are revolving together. The packings are being pressed against the surfaces 13 and $19^a$ and against the wall of the bore 11. The rings 18 and 23 and two packings are stationary with the casing. Therefore the only wear on the packings is that against the plane surfaces 13 and 19[a], and this wear is compensated for under the pressure of the spring or the water through the pipe 25 without any change in the form of the packing. If the wear took place on a cylindrical surface of the packing, such as between the packing and the bore 11, the packing could not take up the wear without being expanded in diameter. Therefore the wear takes place on our packing in the most favorable possible manner. If water under pressure is introduced through the pipe 25, it may take the place of the spring 24, and in case such water is used the right-hand packing 22 serves to prevent its escape toward the right, If for any reason the shaft is shifted longitudinally—as, for instance, in accomplishing the adjustment for bearings, which is described in our said patent—the surfaces 13 and 19[a] will likewise be shifted, but the spring 24 or the fluid-pressure from the pipe 25 will cause the packings to follow the said surfaces, and as the packings do not wear the bore 11 they will fit as well in one place as in the other.

The packing illustrated in Fig. 2 differs from that in Fig. 1 only in that the collar 14 is replaced by a nut 26 and lock-nut 27, similar to the nuts 19 and 20 in Fig. 1.

In the form illustrated in Fig. 3 the ring 28 serves the purposes of the collar 14 in Fig. 1 or of the nuts 26 and 27 in Fig. 2 in so far as it serves as an abutment for the spring 29, and in this embodiment of the invention the left-hand packing is omitted. The packing is preferably made of leather; but any other suitable material may be used.

It may be seen that our packing will effectively prevent leakage through the bore in the casing or other opening through which a shaft passes and that wear will not impair the effectiveness of the packing until the web 17[b] is worn through. It will also be seen that our packing will automatically take up whatever wear occurs and that it will adjust itself to different longitudinal positions of the shaft. It will also be seen that we have provided means for flooding the packing to counterbalance the fluid-pressure outside the packing and prevent leakage.

It is obvious that various changes can be made in the above-described embodiment of our invention which will embody the principles of our invention, and we desire not to be limited beyond the requirements of the prior art and the restrictions necessarily imposed by the terms of our claims.

Having thus described our invention, we claim—

1. A construction for packing revoluble shafts, consisting of the combination of a shaft, a casing having an opening through which the shaft passes, one of such parts having a surface transverse to the axis of the shaft, and the other of such parts having a flexible packing, said packing making a tight joint with the part by which it is carried, and fitting against said surface, said packing being rotatively stationary with reference to the part by which it is carried, and being movable toward said surface to take up wear.

2. A construction for packing revoluble shafts, consisting of the combination of a shaft a casing having an opening through which the shaft passes, a surface transverse to and revolving with the shaft, and a flexible packing adapted to be pressed against said surface and said opening said packing being stationary in said opening so that the only wear on said packing occurs on the part thereof that is pressed against said surface.

3. A construction for packing revoluble shafts against leakage, consisting of the combination of a shaft, a casing having a bore through which the shaft passes, a surface transverse to and revolving with said shaft, and an annular, flexible packing of angular cross-section, one web of said packing bearing against said surface and the other web bearing against said bore, the last-mentioned web being rotatively stationary with reference to said bore, so that the only wear on said packing is that due to said revolving surface, said packing being adjustable along said bore to take up wear.

4. A construction for packing revoluble shafts against leakage of fluid, consisting of the combination of a shaft, a casing having a bore through which the shaft passes, a surface transverse to and revolving with said shaft, an annular, flexible packing of angular cross-section, having one web fitting against said bore, and normally stationary relative thereto, and having the other web bear against said surface, and a spring for pressing said packing against said surface.

5. A construction for packing revoluble shafts against leakage, consisting of the combination of a shaft, a casing having a bore through which said shaft passes, a surface perpendicular to the axis of said shaft and revolving with said shaft, an annular, flexible packing having a cylindrical web adapted to fit against said bore and rotatively stationary relative to said bore, and having a plane web adapted to fit against said surface, the only wear on said packing taking place on said plane web, and means to press said packing against said surfaces.

6. A construction for packing revoluble shafts against leakage, consisting of the combination of a shaft, a casing having a bore through which said shaft passes, a surface perpendicular to the axis of said shaft and revolving with said shaft, an annular, flexible packing having a cylindrical web adapted to fit against said bore and normally stationary relative thereto, and having a plane web adapted to fit against said surface, and means to press said packing against said surfaces, said means comprising a spring coiled about said shaft.

7. A construction for packing revoluble shafts against leakage, consisting of the combination of a shaft, a casing having a bore through which said shaft passes, a surface perpendicular to the axis of said shaft and revolving with said shaft, an annular, flexible packing having a cylindrical web adapted to fit against said bore and normally stationary relative thereto, and having a plane web adapted to fit against said surface, and means to press said packing against said surfaces, said means comprising fluid-pressure.

8. A construction for packing revoluble shafts against leakage, consisting of the combination of a shaft, a casing having a bore through which said shaft passes, a surface perpendicular to the axis of said shaft and revolving with said shaft, an annular, flexible packing having a cylindrical web adapted to fit against said bore and normally stationary relative thereto, and having a plane web adapted to fit against said surface, and means to press said packing against said surfaces, said means comprising both a spring and fluid pressure.

9. A construction for packing revoluble shafts against leakage, consisting of the combination of a shaft, a casing having a bore through which said shaft passes, a surface perpendicular to the axis of said shaft and revolving with said shaft, an annular, flexible packing having a cylindrical web adapted to fit against said bore and normally stationary relative thereto, and having a plane web adapted to fit against said surface, and means to press said packing against said surfaces, said means comprising a ring adapted to fit inside said packing, and a spring adapted to press said ring against said packing.

10. A construction for packing revoluble shafts against leakage, consisting of the combination of a shaft, a casing having a bore through which said shaft passes, two surfaces perpendicular to said shaft and revolving therewith, said surfaces being separated from each other, annular, flexible packings having plane webs fitting against said surfaces, and having cylindrical webs fitting against said bore and normally stationary relative thereto, and means for pressing said packings against their respective surfaces.

11. A construction for packing revoluble shafts against leakage, consisting of the combination of a shaft, a casing having a bore through which said shaft passes, two surfaces perpendicular to said shaft and revolving therewith, said surfaces being separated from each other, annular, flexible packings having plane webs fitting against said surfaces, and having cylindrical webs fitting against said bore and normally stationary relative thereto, and means for pressing said packings against their respective surfaces, said means comprising a spring interposed between said packings.

12. A construction for packing revoluble shafts against leakage, consisting of the combination of a shaft, a casing having a bore through which said shaft passes, two surfaces perpendicular to said shaft and revolving therewith, said surfaces being separated from each other, annular, flexible packings having plane webs fitting against said surfaces, and having cylindrical webs fitting against said bore and normally stationary relative thereto, and means for pressing said packings against their respective surfaces, said means comprising means for conducting fluid under pressure between said packings.

13. A construction for packing revoluble shafts against leakage, consisting of the combination of a shaft, a casing having a bore through which said shaft passes, two surfaces perpendicular to said shaft and revolving therewith, said surfaces being separated from each other, annular, flexible packings having plane webs fitting against said surfaces, and having cylindrical webs fitting against said bore and normally stationary relative thereto, and means for pressing said packings against their respective surfaces, said means comprising a spring and means for conducting fluid under pressure between said packings.

14. A construction for packing revoluble shafts against leakage of fluid, consisting of the combination of a shaft, a casing having a bore through which said shaft passes, two separated collars or nuts secured to said shaft within said bore, their opposing faces being perpendicular to said shaft, two oppositely-disposed annular, flexible packings, each of said packings having a plane web fitting against one of said surfaces, and having a cylindrical web fitting against said bore and normally stationary relative thereto, and means for pressing said packings against said surfaces, said packings and said means for pressing remaining stationary during the revolution of the shaft.

15. A construction for packing revoluble shafts against leakage of fluid on either side thereof, consisting of the shaft, a sleeve surrounding said shaft, and fixed to the shaft a collar thereon, a flexible packing element having angularly-disposed walls, one of which is adapted to press against said collar, and the other against a surface at right angles to the collar and parallel to the shaft.

16. A construction for packing revoluble shafts against the leakage of fluid on either side thereof, consisting of a sleeve surrounding the shaft, and fixed to the shaft a collar rotating with the shaft, a flexible packing element having right-angularly-disposed walls, one of which may be pressed against said collar, and the other against a surface at right angles to said collar and parallel to the shaft, and means to press said walls of said element in both directions and against both surfaces.

17. A construction for packing revoluble shafts against the leakage of fluid on either side thereof, consisting of a sleeve surrounding the shaft, and fixed to the shaft a collar rotating with the shaft, a flexible packing element having right-angularly-disposed walls, one of which may be pressed against said collar, and the other against a surface at right angles to said collar and parallel to the shaft, and a spring exerting its force upon the packing element to press it against the collar.

18. A construction for packing revoluble shafts against the leakage of fluid on either side thereof, consisting of a sleeve surrounding the shaft, and fixed to the shaft a collar rotating with the shaft, a flexible packing element having right-angularly disposed walls, one of which may be pressed against the collar and the other against a surface at right angles to the collar and parallel to the shaft, a member fitting in the angular recess of the packing elements and means to press the packing and the member against or toward the collar.

19. A construction for packing revoluble shafts against the leakage of fluid on either side thereof, consisting of a sleeve surrounding the shaft, and fixed to the shaft collars rotating with the shaft, flexible packing elements each having right-angularly-disposed walls one of which may be pressed against the collars in opposite directions and the other against surfaces at right angles to said collars and parallel to the shaft, and means to create the pressure.

20. A construction for packing revoluble shafts against the leakage of fluid on either side thereof, consisting of a sleeve surrounding said shaft, and fixed to the shaft collars rotating with the shaft, flexible packing elements having right-angularly-disposed walls one of which may be pressed against the collars and the others against surfaces at right angles to said collars and parallel to the shaft, members fitting in the angular recess of said elements, and a spring to press said elements and members in opposite directions against and toward the collars.

21. A construction for packing revoluble shafts against the leakage of fluid on either side thereof, consisting of a sleeve surrounding the shaft, and fixed to the shaft-collars rotating with the shaft, a flexible packing element having right-angularly-disposed walls one of which may be pressed against said collars and the other against surfaces at right angles to said collars and parallel to the shaft, a duct through which pressure may be forced against said packing elements to force them to a packing position.

In testimony that we claim the foregoing we have hereunto set our hands.

EDWARD S. LEA.
JULIUS DEGEN.

Witnesses:
W. P. JOICE,
HARRY A. HANNUM.